US011645641B2

(12) United States Patent
Miller et al.

(10) Patent No.: US 11,645,641 B2
(45) Date of Patent: May 9, 2023

(54) METHOD AND SYSTEM FOR PERFORMING AN OPERATION

(71) Applicant: The Toronto-Dominion Bank, Toronto (CA)

(72) Inventors: Robert Kyle Miller, Mississauga (CA); Kevin Wayne Faragher, Toronto (CA); Malcolm Dinyar Jussawalla, Markham (CA); Tomasz Pawelkiewicz, Toronto (CA); Karandeep Puri, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/071,438

(22) Filed: Oct. 15, 2020

(65) Prior Publication Data

US 2022/0122053 A1    Apr. 21, 2022

(51) Int. Cl.
*G06Q 20/32* (2012.01)
*G06Q 20/40* (2012.01)
(52) U.S. Cl.
CPC ..... *G06Q 20/3221* (2013.01); *G06Q 20/3223* (2013.01); *G06Q 20/4014* (2013.01)
(58) Field of Classification Search
None
See application file for complete search history.

(56) References Cited

U.S. PATENT DOCUMENTS

2015/0186872 A1 * 7/2015 Sobol .................. G06Q 20/385
705/41

* cited by examiner

*Primary Examiner* — Namrata Boveja
*Assistant Examiner* — Amit Patel
(74) *Attorney, Agent, or Firm* — Rowand LLP

(57) ABSTRACT

A server comprises a communications module; a processor coupled with the communications module; and a memory coupled to the processor and storing processor-executable instructions which, when executed by the processor, configure the processor to receive, via the communications module and from a computing device, a signal representing a request to perform an operation from a user; determine that the user does not have a persistent account; and when it is determined that the user does not have a persistent account: obtain, via the communications module and from a digital identity network, a signal including verified identity data of the user; generate a temporary data record and associate the temporary data record with the verified identity data of the user; receive a value transfer based on the requested operation and store the received value in the temporary data record; and perform the operation using the stored value in the temporary data record.

22 Claims, 9 Drawing Sheets

METHOD AND SYSTEM FOR PERFORMING AN OPERATION

TECHNICAL FIELD

The present application relates to methods and systems for performing an operation.

BACKGROUND

Users are typically required to have a persistent account associated with an entity before they are able to submit a request that an operation be performed by the entity. For example, a user must open a persistent account and transfer value into the persistent account prior to submitting a request to perform an operation.

When opening the persistent account, the entity may require verification of the identity of the user and this may be done using, for example, government issued identification. Verification of the identity of the user typically requires that the user be physically present and this process may be time consuming and inefficient.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
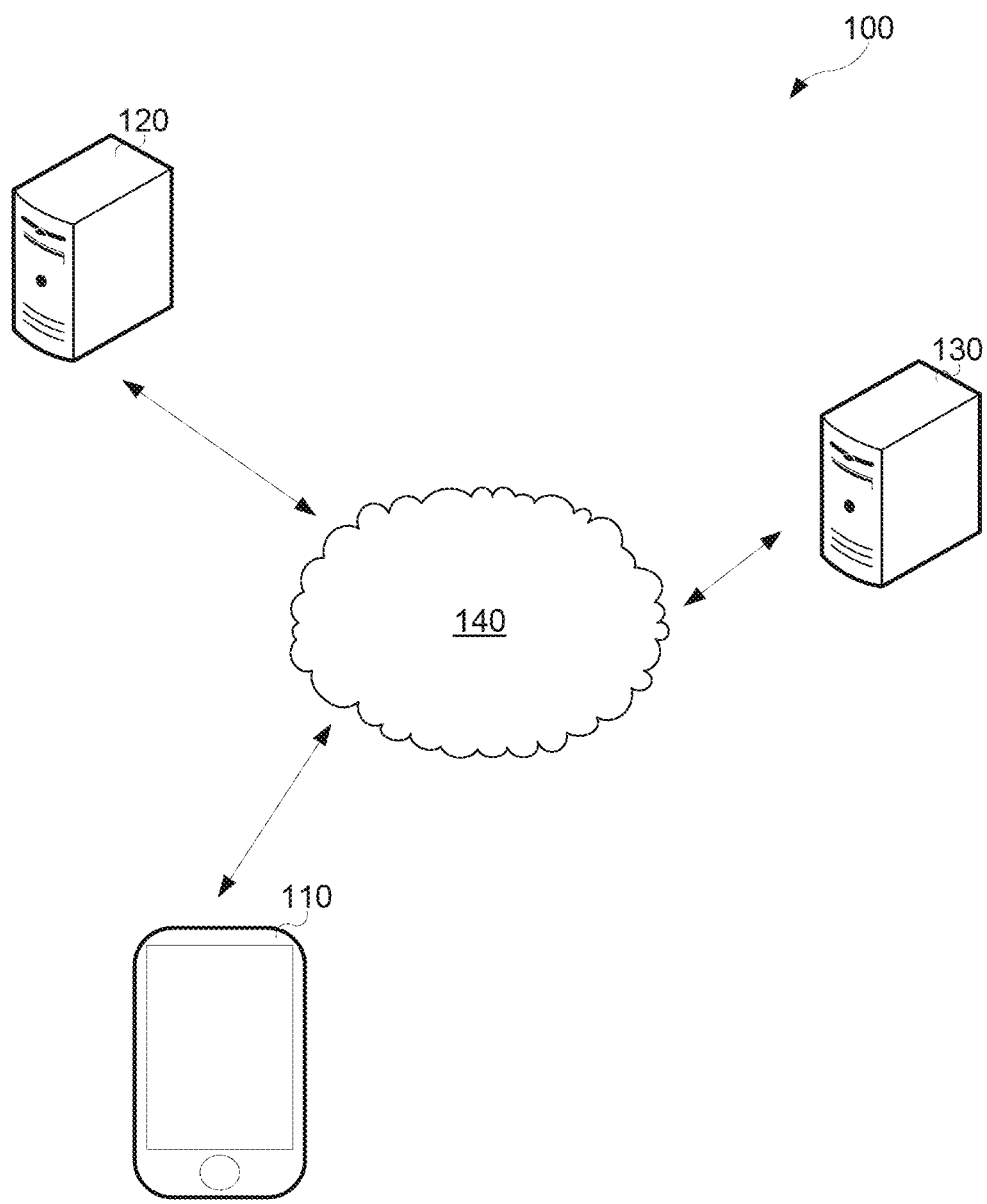
FIG. 1 is a schematic operation diagram illustrating an operating environment of an example embodiment.

Accordingly, in one aspect there is provided a server comprising a communications module; a processor coupled with the communications module; and a memory coupled to the processor and storing processor-executable instructions which, when executed by the processor, configure the processor to receive, via the communications module and from a computing device, a signal representing a request from a user to perform an operation; determine that the user does not have a persistent account; and when it is determined that the user does not have the persistent account: obtain, via the communications module and from a digital identity network, a signal including verified identity data of the user; generate a temporary data record and associate the temporary data record with the verified identity data of the user; receive a value transfer based on the requested operation and store the received value in the temporary data record; and perform the operation using the stored value in the temporary data record.

In one or more embodiments, the instructions, when executed by the processor, further configure the processor to in response to performing the operation, deactivate the temporary data record.

In one or more embodiments, the instructions, when executed by the processor, further configure the processor to determine that a value in the temporary data record is zero; and in response to determining that the value in the temporary data record is zero, deactivate the temporary data record.

In one or more embodiments, the temporary data record is a single use data record.

In one or more embodiments, the instructions, when executed by the processor, further configure the processor to receive, via the communications module and from the digital identity network, a signal identifying an account hosted by a third-party server providing the value transfer.

In one or more embodiments, the instructions, when executed by the processor, further configure the processor to send, via the communications module and to the third-party server, a request for the value transfer.

In one or more embodiments, the instructions, when executed by the processor, further configure the processor to determine that the request to perform the operation includes a value transfer request greater than a threshold amount; and when it is determined that the request to perform the operation includes the value transfer request greater than the threshold amount, send, via the communications module and to the computing device, a signal representing a request for the user to create a persistent account.

In one or more embodiments, the instructions, when executed by the processor, further configure the processor to send, via the communications module and to the computing device, a signal representing a request for additional identity data confirming the identity of the user; receive, via the communications module and from the computing device, a signal including the requested additional identity data; and analyze the received additional identity data to confirm the identity of the user.

In one or more embodiments, the instructions, when executed by the processor, further configure the processor to determine that the user does have a persistent account; and when it is determined that the user does have a persistent account, perform the operation using value stored in the persistent account without engaging the digital identity network.

In one or more embodiments, the digital identity network includes a permissioned blockchain network.

According to another aspect there is provided a computer-implemented method comprising receive, via a communications module and from a computing device, a signal representing a request from a user to perform an operation; determine that the user does not have a persistent account; and when it is determined that the user does not have the persistent account obtaining, via the communications module and from a digital identity network, a signal including verified identity data of the user; generating a temporary data record and associating the temporary data record with the verified identity data of the user; receiving a value transfer based on the requested operation and storing the received value in the temporary data record; and performing the operation using the stored value in the temporary data record.

In one or more embodiments, the method further comprises in response to performing the operation, deactivating the temporary data record.

In one or more embodiments, the method further comprises determining that a value in the temporary data record is zero; and in response to determining that the value in the temporary data record is zero, deactivating the temporary data record.

In one or more embodiments, the temporary data record is a single use data record.

In one or more embodiments, the method further comprises receiving, via the communications module and from the digital identity network, a signal identifying an account hosted by a third-party server providing the value transfer.

In one or more embodiments, the method further comprises sending, via the communications module and to the third-party server, a request for the value transfer.

In one or more embodiments, the method further comprises determining that the request to perform the operation includes a value transfer request greater than a threshold amount; and when it is determined that the request to perform the operation includes the value transfer request greater than the threshold amount, sending, via the communications module and to the computing device, a signal representing a request for the user to create a persistent account.

In one or more embodiments, the method further comprises sending, via the communications module and to the computing device, a signal representing a request for additional identity data confirming the identity of the user; receiving, via the communications module and from the computing device, a signal including the requested additional identity data; and analyzing the received additional identity data to confirm the identity of the user.

In one or more embodiments, the method further comprises determining that the user does have a persistent account; and when it is determined that the user does have a persistent account, performing the operation using value stored in the persistent account without engaging the digital identity network.

According to another aspect there is provided a non-transitory computer readable storage medium comprising computer-executable instructions which, when executed, configure a processor to receive, via a communications module and from a computing device, a signal representing a request from a user to perform an operation; determine that the user does not have a persistent account; and when it is determined that the user does not have the persistent account obtain, via the communications module and from a digital identity network, a signal including verified identity data of the user; generate a temporary data record and associate the temporary data record with the verified identity data of the user; receive a value transfer based on the requested operation and store the received value in the temporary data record; and perform the operation using the stored value in the temporary data record.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

When a user or customer opens an account with an institution, the institution may be required to verify the identity of the user to fulfil, for example, Know Your Customer (KYC) requirements. Most institutions require at least two criteria to be completed to verify the identity of the user: 1) the institution obtains identity information of the user, and 2) the institution verifies the user's identity. The identity information may be obtained electronically but verification may require the user to visit the institution to show identification verifying their identity. Once the identity of the user has been verified, the account is opened and the user is able to request that the institution perform one or more operations associated with their account.

In the following, a system is described that allows non-customers to request that the institution perform one or more operations. Prior to operation being performed, the system may verify the identity of the user through use of a digital identity network and may create a temporary account to be used to complete the requested operation.

FIG. 1 is a block diagram illustrating an operating environment of an example embodiment. Various components cooperate to provide a system 100 which may be used, for example, to perform an operation. As shown, the system 100 includes a computing device 110, a server 120 and a digital identity network server 130 coupled to one another through a network 140, which may include a public network such as the Internet and/or a private network.

The server 120 may be referred to as a data transfer server and may be configured to transfer data between data records in a database. The server 120 may maintain data records for a plurality of users. In at least some embodiments, the server 120 is a value transfer server or financial institution server which may maintain customer bank accounts. That is, the server 120 may maintain a database that includes various data records. A data record may, for example, reflect an amount of value stored in a particular account associated with a user. A data record may be a persistent data record or may be a temporary data record. Persistent data records may be associated with persistent customer bank accounts.

The computing device 110 may take a variety of forms such as a smartphone, a tablet computer, a wearable computer such as a head-mounted display or smartwatch, a laptop or desktop computer, or a computing device of another type. In certain embodiments, a user may operate the computing device 110 to cause the computing device 110 to request that an operation be performed on one or more data records.

The computing device 110 is adapted to present a graphical user interface that allows for communication with the server 120. For example, the computing device 110 may be adapted to send, to the server 120, a signal representing a request to perform an operation on one or more data records.

The digital identity network server 130 is a server associated with a digital identity network. Although the digital identity network server 130 is illustrated as a single block, it may be a network consisting of numerous computer systems. For example, the digital identity network may be a blockchain network which includes a number of nodes. The blockchain network is a decentralized peer-to-peer network in which nodes may maintain respective copies of an append-only ledger.

The blockchain network may be a permissioned blockchain network in which only authorized nodes are permitted to add blocks to the blockchain. For example, only verified nodes may be granted permission to write to the blockchain. The verified nodes may be trusted nodes such as nodes associated with government organizations or other trusted entities such as banks. By way of example, the verified nodes may be associated with a driver's license bureau, a credit bureau, a government identity issuing office such as an entity registry office, or an office of another type. Given ones of these nodes may maintain identity records of various types. For example, a node associated with a passport office may maintain digital passport records, a node associated with a driver's license bureau may maintain digital licensing records, a node associated with a credit bureau may maintain digital credit records, and a node associated with a bank may maintain digital banking records. Various verified nodes may maintain contact information records which may, for example, specify an email address, postal address, telephone number, or other types of contact information.

Accordingly, at least some verified nodes may write to the blockchain. At least some of the blocks written to the blockchain may be related to verified identity data. The digital identity network server 130 may store verified identity data associated with a plurality of users. In at least some embodiments, verified identity data may not be included in the blockchain. Instead, the blocks may store a private secret that is related to such verified identity data. The private secret may act as proof to the existence of the verified identity data and may be used to verify the authenticity of the verified identity data. For example, in at least some embodiments, the private secret may be a hash of the verified identity data such that, when the verified identity data is provided to another system (i.e., a system apart from the verified node maintaining the identity data), it may be verified from the hash stored in a block on the blockchain.

The blockchain network may, for example, be implemented using Hyperledger Fabric, for example. It will, however, be appreciated that the blockchain network may take other forms.

Within the digital identity network, of which the digital identity network server 130 is associated, trusted partners may act as digital asset providers and digital asset consumers. In actions as a digital asset provider, a trusted member of the digital identity network may provide information about a particular user or customer to another trusted member of the digital identity network (e.g. a digital asset consumer). The requested information may be provided through the digital identity network via the digital identity network server 130 in a blind manner such that the digital asset provider does not know the identity of the digital asset consumer and such that the digital asset consumer does not know the identity of the digital asset provider.

The network 140 is a computer network. In some embodiments, the network 140 may be an internetwork such as may be formed of one or more interconnected computer networks. For example, the network 140 may be or may include an Ethernet network, an asynchronous transfer mode (ATM) network, a wireless network, a telecommunications network, or the like.

FIG. 1 illustrates an example representation of components of the system 100. The system 100 can, however, be implemented differently than the example of FIG. 1. For example, various components that are illustrated as separate systems in FIG. 1 may be implemented on a common system. By way of further example, the functions of a single component may be divided into multiple components.

Figure 2:
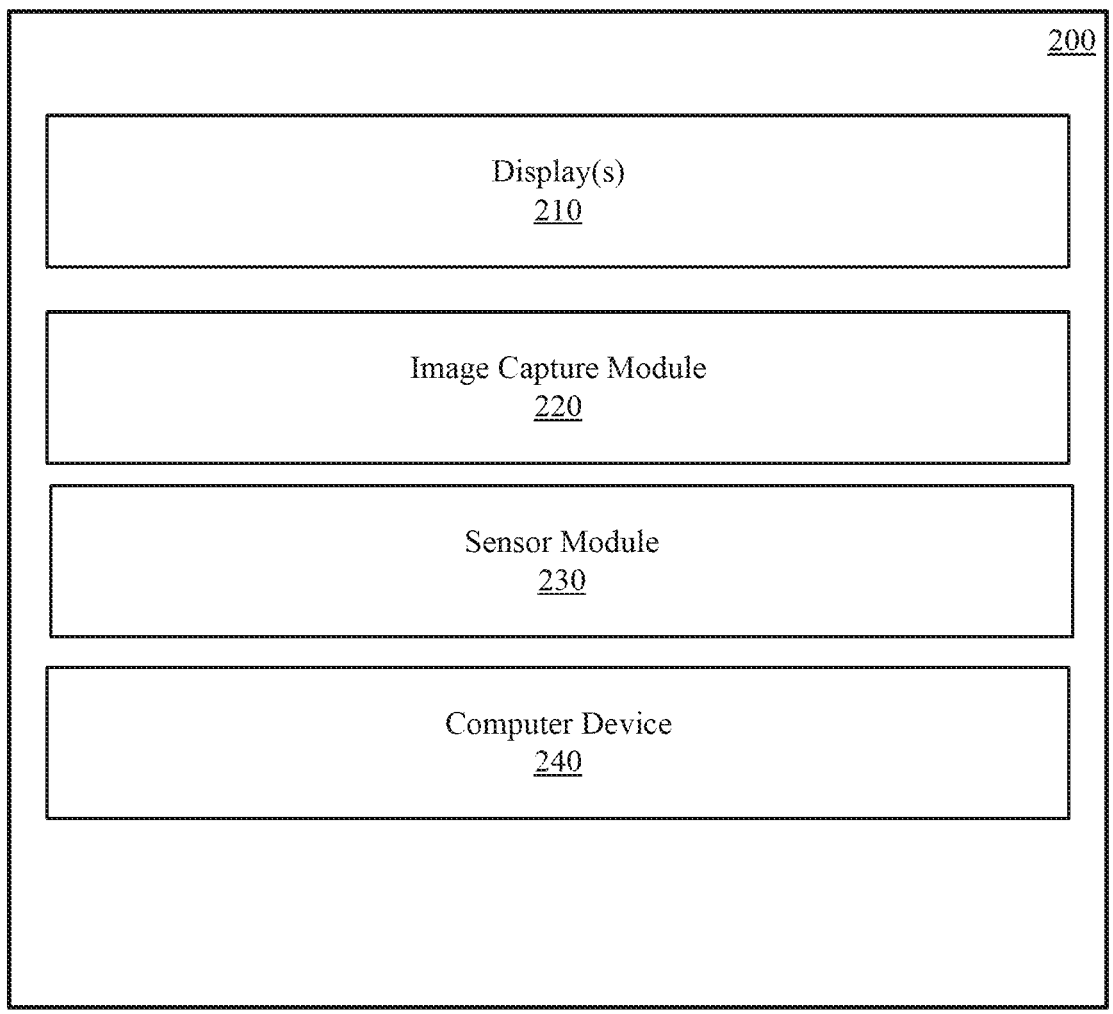
FIG. 2 is a simplified schematic diagram showing components of a computing device.

FIG. 2 is a simplified schematic diagram showing component of an exemplary computing device 200. Computing device 110 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the server 120 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
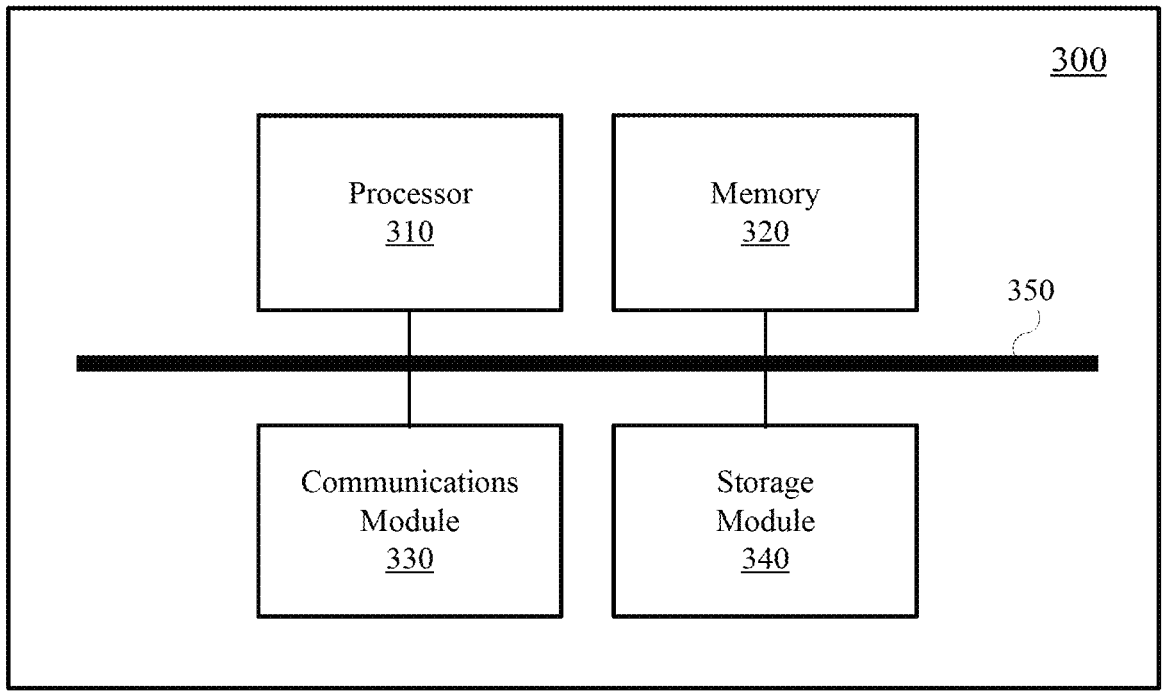
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2), the server 120, and the digital identity network server 130 (or a node of the digital identity network).

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
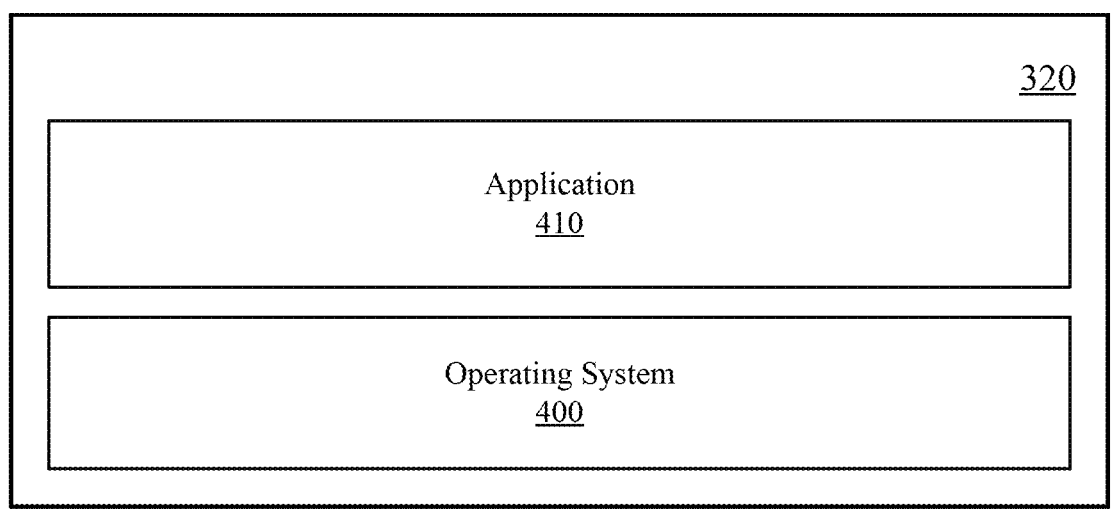
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2), the server 120, and/or the digital identity network server 130 (or a node of the digital identity network).

While a single application 410 is illustrated in FIG. 3, in operation the memory 320 may include more than one application 410 and different applications 410 may perform different operations. For example, in at least some embodiments in which the computer device 300 is functioning as the computing device 110, the applications 410 may include a banking application. The banking application may be configured for secure communications with the server 120 and may provide various banking functions such as, for example, the ability to display a quantum of value in one or more data records (e.g. display balances), configure or request that operations such as transfers of value (e.g. bill payments and other transfers) be performed, and other account management functions.

By way of further example, in at least some embodiments in which the computer device 300 functions as the computing device 110, the applications 410 may include a web browser, which may also be referred to as an Internet browser. In at least some such embodiments, the server 120 may be a web server that may serve one or more of the interfaces described herein. The web server may cooperate with the web browser and may serve as an interface when the interface is requested through the web browser. For example, the web browser may serve as a mobile banking interface. The mobile banking interface may provide various banking functions such as, for example, the ability to display a quantum of value in one or more data records (e.g. display balances), configure or request that operations such as transfers of value (e.g. bill payments and other transfers) be performed, and other account management functions.

By way of further example, in at least some embodiments in which the computer device 300 functions as the computing device 110, the applications 410 may include an electronic messaging application. The electronic messaging application may be configured to display a received electronic message such as an email message, short messaging service (SMS) message, or a message of another type. In at least some embodiments, the server 120 or digital identity network server 130 may be configured, through computer-executable instructions, to send a message to the computing device 110. For example, the server 120 may be configured to send a SMS message to a phone number associated with a user and an electronic messaging application on the computing device 110 may be configured to retrieve the message and display the message to the user.

The mobile banking application and/or the web browser serving as the mobile banking interface may be operable in two modes. A first mode may require that the user have a persistent account maintained by the server 120. Operation in the first mode requires login credentials of the user. Once logged in, the user may request that the server 120 perform one or more operations.

A second mode may not require that the user have a persistent account maintained by the server 120. Operation in the second mode does not require login credentials of the user. The user may, however, request that the server 120 perform one or more operations. Once requested, the server 120 may generate a temporary data record that may be used to perform a requested operation. In this manner, a user that is not a customer of the financial institution associated with the server 120 may utilize features or operations offered by the financial institution without having to open a persistent account with the financial institution.

Figure 5:
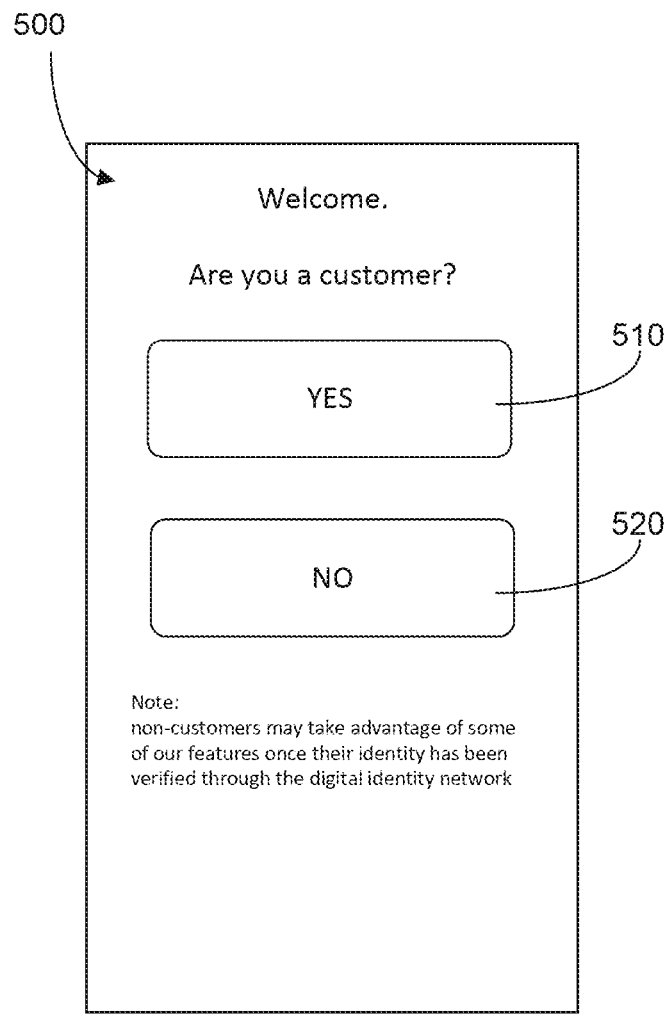
FIG. 5 is an example graphical user interface.

The user may open the mobile banking application or the web browser on the computing device 110. In response, the server 120 may send a signal to the computing device 110 causing the computing device 110 to display a graphical user interface (GUI). The GUI may be used to communicate with the server 120. An example GUI 500 is shown in FIG. 5. As can be seen, the GUI 500 includes a first selectable option 510 which is used to indicate that the user is a customer and a second selectable option 520 which is used to indicate that the user is not a customer. Each selectable option 510, 520 may be selected by the user via the input interface associated with the computing device 110. For example, the user may select one of the selectable options 510, 520 via touch input on a display screen of the computing device 110.

Although the GUI 500 is shown as including first and second selectable options 510, 520, in another embodiment the GUI may display a toggle that, when selected by the user via touch input, toggles between the first mode of operation and the second mode of operation. In another embodiment, separate mobile banking applications or mobile banking interfaces may be used when the user is a customer or when the user is not a customer. For example, a particular mobile banking application may be available for customers and a separate particular mobile banking application may be available for non-customers. These mobile banking applications may be downloaded separately through use of, for example, a mobile application library.

Figure 6:
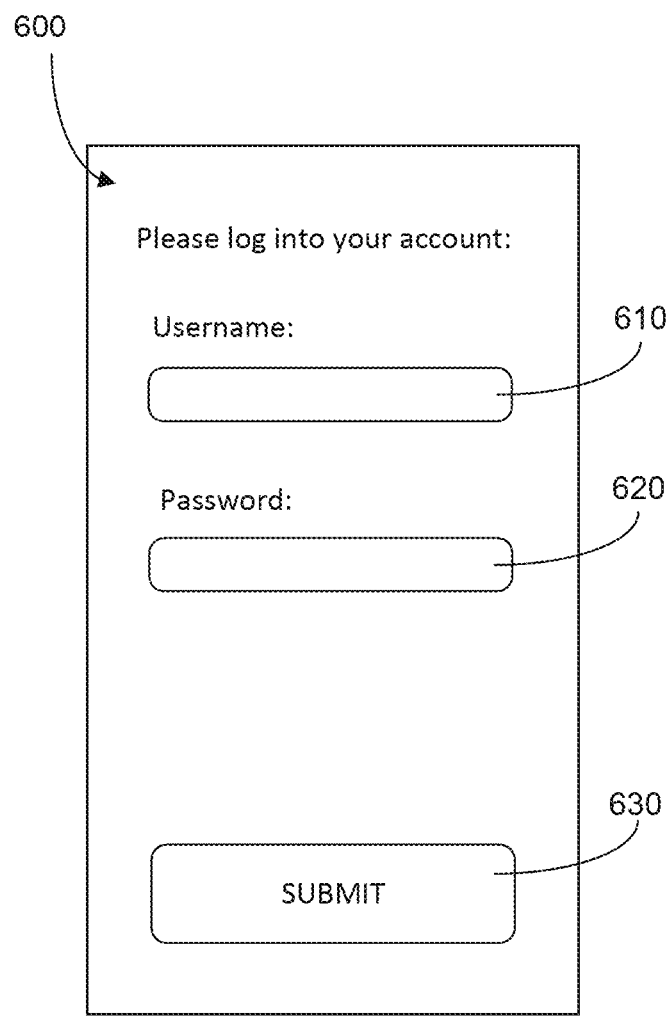
FIG. 6 is an example graphical user interface.

In response to the user selecting the first selectable option 510, a signal is sent from the computing device 110 to the server 120 indicating that the user is a customer. In response, the server 120 configures the mobile banking application or the mobile banking interface to operate in the first mode where user login is required. Specifically, the server 120 sends a signal to the computing device 110 causing the computing device 110 to display a GUI. The GUI may be used to communicate with the server 120. An example GUI 600 is shown in FIG. 6. As can be seen, the GUI 600 includes a first input field 610 which is used to enter a username of the user, a second input field 620 which is used to enter a password of the user, and a selectable option 630 used to submit the entered username and password to the server 120. The user may enter the username and password using the input interface associated with the computing device 110. For example, the computing device 110 may display a virtual keyboard on the display screen thereof and the virtual keyboard may be used to enter the username and password. The user may select the selectable option 630 via touch input on the display screen of the computing device 110. The entered username and password may be verified by the server 120 to complete user login. It will be appreciated that the computing device 110 may automatically complete the login process using, for example, stored login information and/or biometric data. For example, the computing device 110 may utilize facial recognition techniques or fingerprint detection techniques to retrieve stored login information to complete the login process. Once the user has successfully logged in, the user may navigate to a particular page within the mobile banking application or the mobile banking interface causing the server 120 to send a signal to the computing device 110. The signal may cause the computing device to display a GUI that may be utilized by the user to request that the server 120 perform one or more operations, as will be described in more detail below.

In response to the user selecting the second selectable option 520, a signal is sent from the computing device 110 to the server 120 indicating that the user is not a customer. In response, the server 120 configures the mobile banking application or the mobile banking interface to operate in the second mode where user login is not required. Rather, the server 120 may send a signal to the computing device 110 causing the computing device to display a GUI that may be utilized by the user to request that the server 120 perform one or more operations, as will be described in more detail below.

Figure 7:
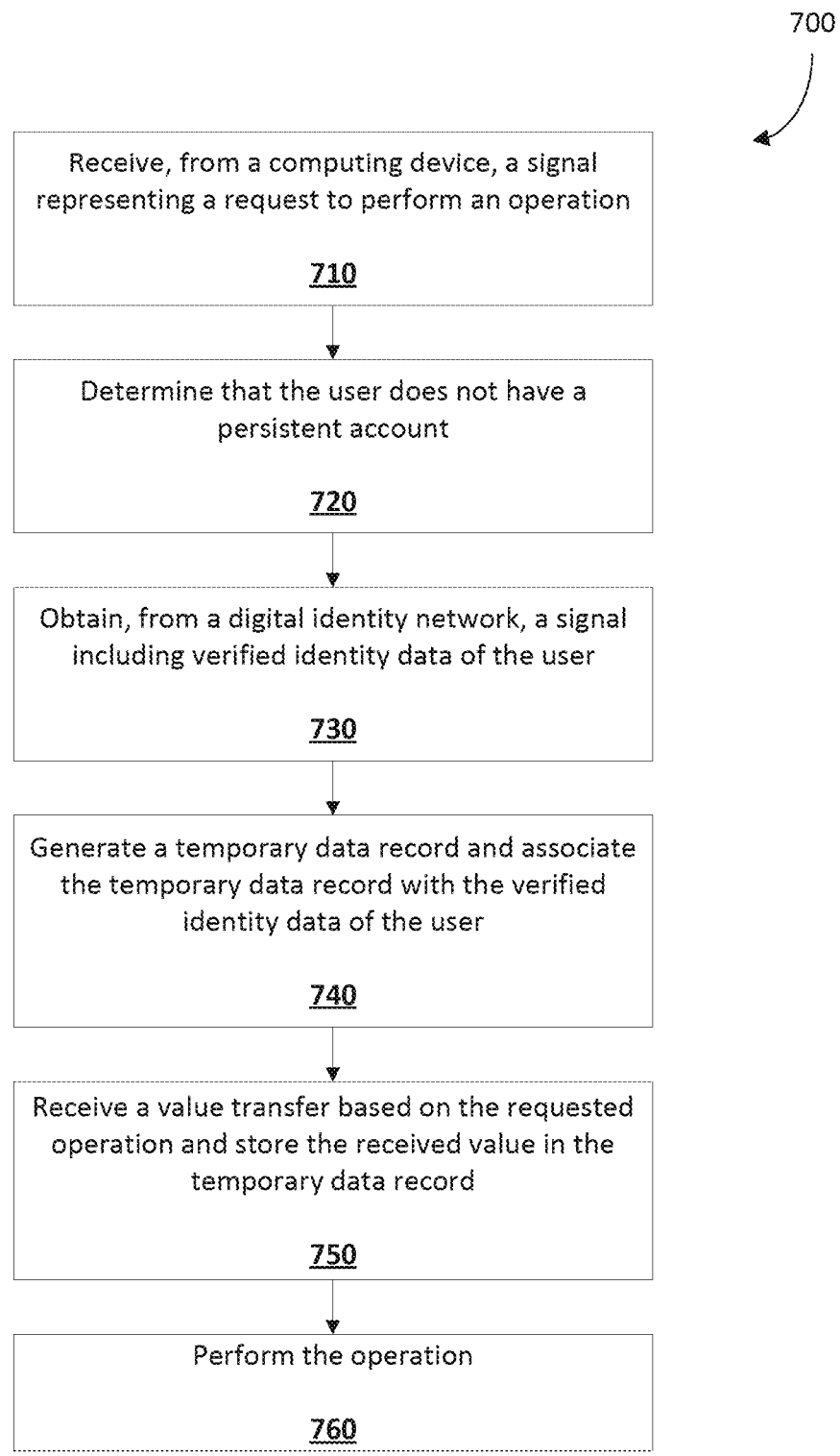
FIG. 7 is flowchart showing operations performed by a server in performing an operation according to an embodiment.

The user may utilize the GUI displayed on the computing device 110 to initiate a request to perform an operation. Embodiments of operations performed by the server 120 in performing an operation will now be described. FIG. 7 is a flowchart showing operations performed by the server 120 in performing an operation according to an embodiment. The operations may be included in a method 700 which may be performed by the server 120. For example, computer-executable instructions stored in memory of the server 120 may, when executed by one or more processors, configure the server 120 to perform the method 700 or a portion thereof.

The server 120 receives, via the communications module and from the computing device 110, a signal representing a request to perform an operation (step 710).

The operation may be a banking operation that needs to be funded. For example, the operation includes one or more of a remittance (sending money), an international remittance (sending money internationally) or requesting a bank draft. Each operation may require a fee and as such the amount of value required to fund the operation may exceed the amount of value requested for the operation. For example, the user may request that the operation send a remittance of $100 and this may require a fee of $5. As such, a total of $105 may be required to fund the operation.

As mentioned, during operation in the first mode and the second mode, the server 120 may send a signal to the computing device 110 causing the computing device to display a GUI that may be utilized by the user to request that the server 120 perform one or more operations. In this embodiment, the GUI displayed by the computing device 110 is the same GUI regardless of whether or not the mobile banking application or mobile banking interface is operating in the first mode or the second mode. It will however be appreciated that a first GUI may be displayed during operation in the first mode and a second GUI may be displayed in the second mode. The first GUI may include more options than the second GUI as the first GUI is used when the user is a customer and the second GUI is used when the user is not a customer.

Figure 8:
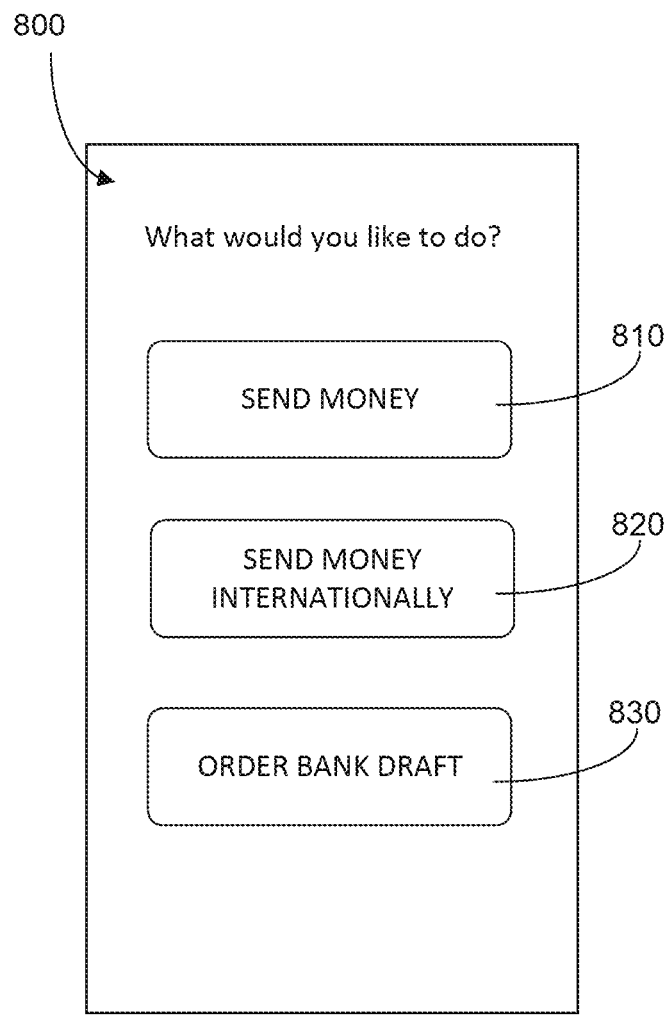
FIG. 8 is an example graphical user interface.

An example GUI 800 is shown in FIG. 8. As can be seen, the GUI 800 includes one or more selectable options, each of which is associated with a particular operation. Specifically, the GUI 800 includes a first selectable option 810, a second selectable option 820, and a third selectable option 830. In this embodiment, the first selectable option 810 is associated with a remittance ("sending money") operation. The second selectable option 820 is associated with an international remittance ("sending money internationally") operation. The third selectable option 830 is associated with an order bank draft ("order bank draft") operation. The user may select one of the selectable options 810, 820, 830 via touch input on the display screen of the computing device 110.

The computing device 110 sends a signal to the server 120 representing a request to perform an operation to in response to the user selecting one of the selectable options 810, 820, 830 and the server 120 receives the signal representing the request to perform the operation.

In response to receiving the signal representing the request to perform the operation, the server 120 may send a signal to the computing device 110 causing the computing device 110 to display a GUI that includes one or more input fields. For example, where the requested operation is a remittance or an international remittance, the one or more input fields may be associated with information identifying a recipient bank account that is to receive the remittance when the requested operation is performed. Specifically, the input fields may be used to enter information indicating the recipient bank account number and recipient bank branch. The bank account number may be an international bank account number (IBAN) which is a series of alphanumeric characters that uniquely identifies an account that is to receive the remittance. The bank branch may be identified using the Society of Worldwide Interbank Financial Telecommunications (SWIFT) Bank Identifier Codes (BIC). The user may complete the input fields and the server 120 may receive a signal including information identifying the recipient bank account. The server 120 may store this information in memory.

The server 120 determines that the user does not have a persistent account (step 720). In this embodiment, the server 120 may determine that the user does not have a persistent account based on whether or not the user has logged in. For example, the server 120 may determine that the user has indicated that they not a customer by determining that the user has selected the selectable option 520 of GUI 500. As mentioned, since the user is not a customer the user does not have a persistent account maintained by the server 120.

When it is determined that the user does not have a persistent account maintained thereby, the server obtains, via the communications module and from the digital identity network, a signal including verified identity data of the user (step 730).

In this embodiment, the server 120 may send a signal to the computing device 110 causing the computing device 110 to display a GUI that includes one or more input fields. The one or more input fields may be used to enter identity information of the user. For example, the one or more input fields may be associated with a first name, a last name, an address, a telephone number, an email address, a social security number, a social insurance number, etc. The user may provide identity information by completing the one or more input fields and in response the computing device 110 may send a signal to the server 120 including the identity information of the user.

The server 120 receives the signal including the identity information of the user from the computing device 110 and performs operations to authenticate or verify the identity of the user using the digital identity network.

In this embodiment, the server 120 sends, via the communications module and to the digital identity network server 130, a request for verified identity data of the user. In this embodiment, the request for verified identity data includes the identity information of the user.

In response to receiving the request for verified identity data, the digital identity network server 130 sends a request for verified identity data of the user to the trusted partners within the digital identity network. The request includes the identity information of the user. For example, the request may include a request for verified identity data of the user based on the social security number or social insurance number. One of the trusted members of the digital identity network may act as a digital asset provider and thus may provide the requested verified identity data of the user to the digital identity network server 130. The digital identity network server 130 may provide the requested verified identity data to the server 120. As such, the server 120 acts as a digital asset consumer. The requested verified identity data is provided through the digital identity network in a blind manner such that the digital asset provider does not know the identity of the digital asset consumer and such that the digital asset consumer does not know the identity of the digital asset provider. It will be appreciated that in some embodiments, the digital identity network server 130 may send a signal to the computing device 110 that includes a request to release verified identity data to the server 120. The user may grant permission to release verified identity data to the server 120 by selecting a selectable option included with the request. In response to the user granting permission, the digital identity network server 130 may release the requested verified identity data to the server 120.

The verified identity data may include additional identity information of the user and may include information indicating that the identity of the user has been verified or authenticated by the digital asset provider. In this manner, the verified identity data of the user received via the digital identity network is sufficient to permit the user to request that the server 120 perform an operation. Put another way, the digital asset provider has previously verified the identity of the user and this verified identity data can be trusted by the financial institution associated with the server 120.

The server 120 generates a temporary data record and associates the temporary data record with the verified identity data of the user (step 740).

The temporary data record may be a single use data record or may be a general holding data record. The temporary data record is associated with the verified identity data of the user. The temporary data record may be assigned an account number and the server 120 may send a signal to the computing device 110 that causes the computing device 110 to display the account number to the user. The account number may be used to fund the temporary data record, as will be described.

The server 120 receives a value transfer based on the requested operation and stores the received value in the temporary data record (step 750). In this embodiment, the server 120 may receive the value transfer using electronic funds transfer (EFT) or email money transfer.

Figure 9:
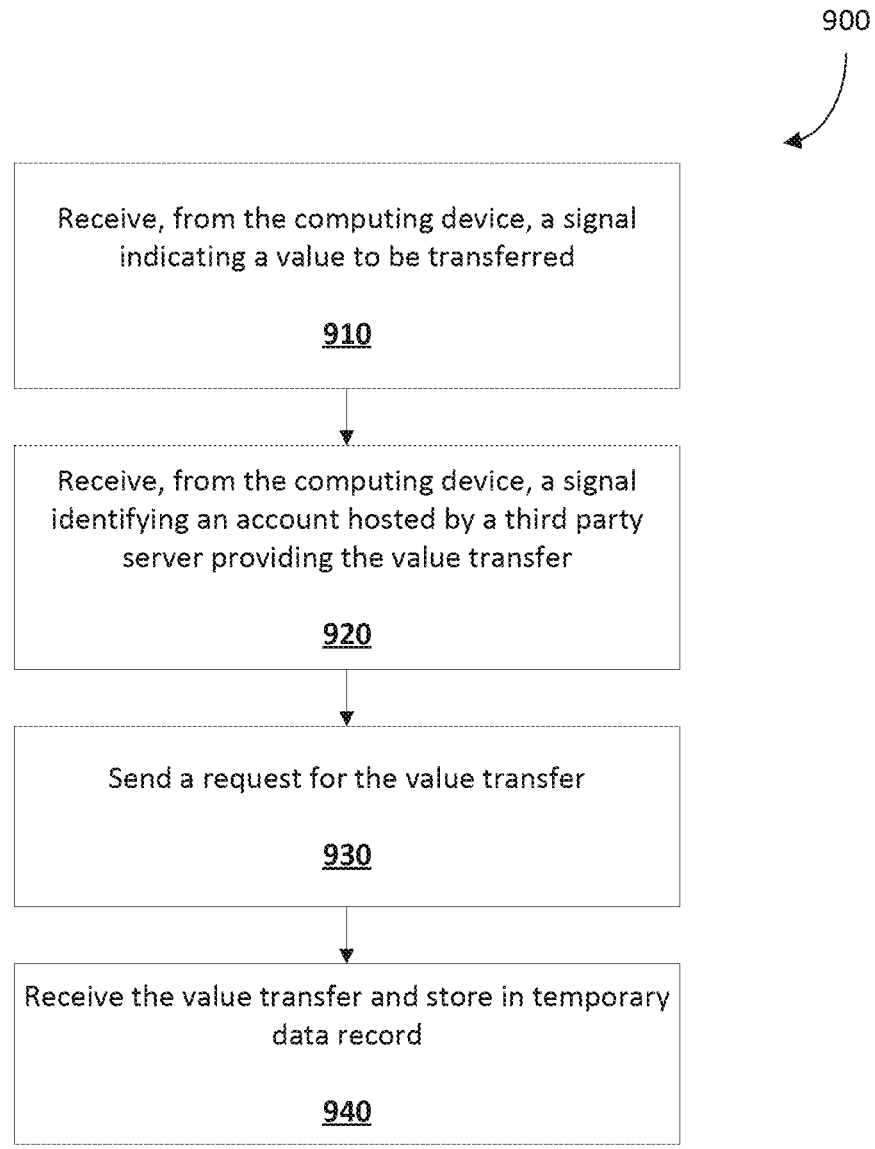
FIG. 9 is a flowchart showing operations performed by a server in receiving a value transfer.

The server 120 may receive the value transfer from a third-party server. The third-party server may be associated with a different financial institution which may be a financial institution where the user has a persistent account. FIG. 9 is a flowchart showing operations performed by the server 120 in receiving a value transfer according to an embodiment. The operations may be included in a method 900 which may be performed by the server 120. For example, computer-executable instructions stored in memory of the server 120 may, when executed by one or more processors, configure the server 120 to perform the method 900 or a portion thereof.

The server 120 receives, via the communications module and from the computing device 110, a signal indicating a value to be transferred (step 910). In this embodiment, once verified identity data has been received by the server 120, the server 120 may send, via the communications module and to the computing device 110, a signal including a request for a value to be transferred. For example, where the operation to be performed is a remittance or an international remittance, the server 120 may request that the user provide the value or amount of money to be remitted. The request may include, for example, an input field that may be completed by the user via the input interface associated with the computing device 110.

The server 120 receives, via the communications module and from the computing device 110, a signal identifying an account hosted by a third-party server providing the value transfer (step 920). In this embodiment, the server 120 may send, via the communications module and to the computing device 110, a signal including a request for account information indicating which account the value is to be transferred from. For example, the server 120 may request an account number of the persistent account of the user hosted by the third-party server. The account number may include, for example, an institution number and a transit number of the institution associated with the third-party server.

The server 120 sends, via the communications module and to the third-party server, a request for the value transfer (step 930). In this embodiment, the request includes the value to be transferred and the account number of the persistent account hosted by the third-party server. The value to be transferred may be equal to the value received in step 910. In the event that there is a fee associated with the requested operation, the value to be transferred may include the fee and the value requested during step 910.

In response to the request, the third-party server may send a signal to the computing device 110 requesting that the user confirm that the server 120 is indeed approved to receive the value transfer. The user may grant permission to complete the value transfer by selecting a selectable option included with the request. In response to the user granting permission, the third-party server may complete the value transfer. The value transfer may be sent in real-time or near real-time by utilizing real-time payment rails.

The server 120 receives, via the communications module and from the third-party server, the requested value transfer and stores the value in the temporary data record (step 940). The stored value may be equal to the value requested during step 910 or may be equal to the fee associated with the requested operation and the value received during step 910. The server 120 may receive the requested value transfer in real-time or near real-time by utilizing real-time payment rails.

Figure 10:
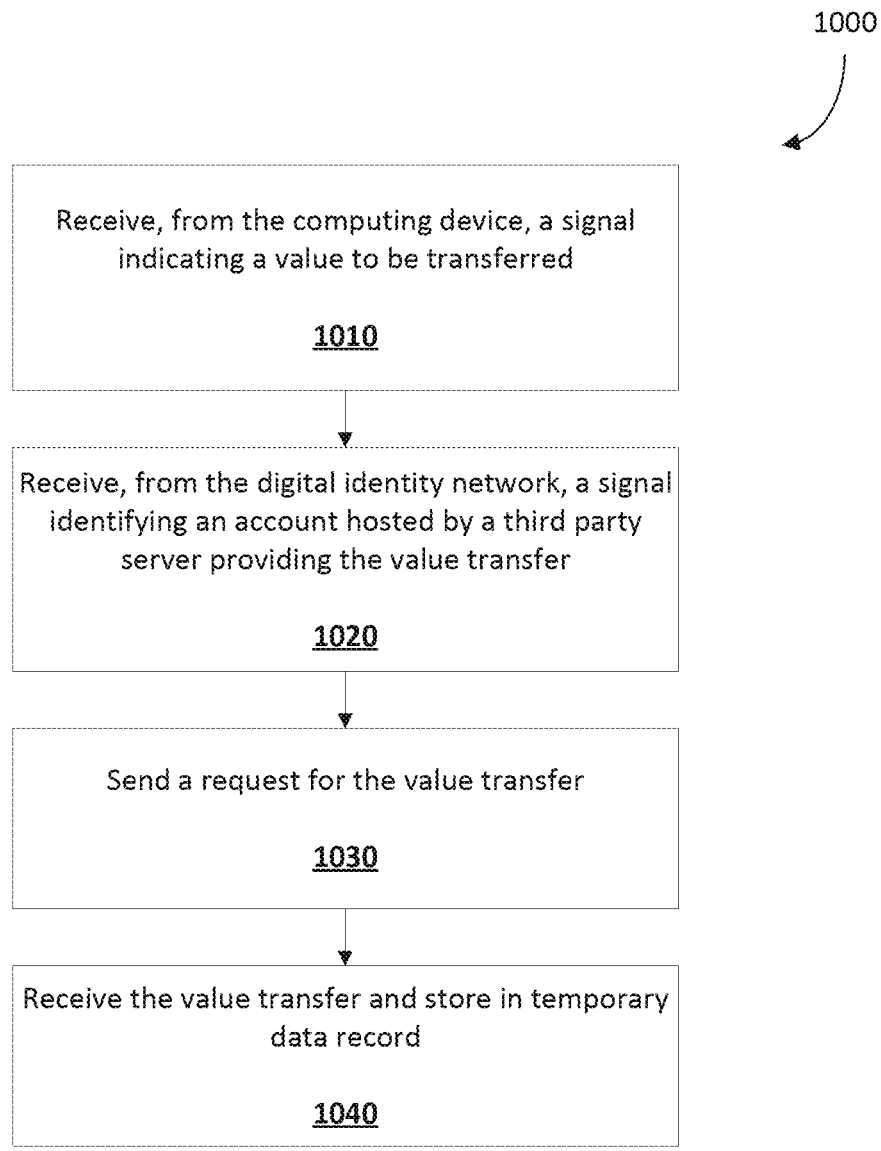
FIG. 10 is a flowchart showing operations performed by a server in receiving a value transfer.

In another embodiment, the server 120 may obtain account information for the account hosted by the third-party server via the digital identity network. FIG. 10 is a flowchart showing operations performed by the server 120 in receiving a value transfer according to an embodiment. The operations may be included in a method 1000 which may be performed by the server 120. For example, computer-executable instructions stored in memory of the server 120 may, when executed by one or more processors, configure the server 120 to perform the method 1000 or a portion thereof.

The server 120 receives, via the communications module and from the computing device 110, a signal indicating a value to be transferred (step 1010). Step 1010 is generally similar to that described herein with reference to step 910.

The server 120 receives, via the communications module and from the digital identity network, a signal identifying an account hosted by a third-party server providing the value transfer (step 1020).

In this embodiment, the server 120 sends, via the communications module and to the digital identity network server 130, a request for account information of the user. The request for account information of the user includes at least some identity information of the user.

In response to receiving the request for account information of the user, the digital identity network server 130 sends a request for account information to the trusted partners within the digital identity network. The request includes the identity information of the user. For example, the request may include a request for account information of the user based on the social security number or social insurance number. One of the trusted members of the digital identity network may act as a digital asset provider and thus may provide the requested account information to the digital identity network server 130. For example, one of the trusted members of the digital identity network may be a financial institution that hosts a persistent account of the user. The digital identity network server 130 may provide the account information to the server 120. As such, the server 120 acts as a digital asset consumer. It will be appreciated that in some embodiments, the digital identity network server 130 may send a signal to the computing device 110 that includes a request to release account information to the server 120. The user may grant permission to release account information to the server 120 by selecting a selectable option included with the request. In response to the user granting permission, the digital identity network server 130 may release the requested account information to the server 120.

The server 120 sends, via the communications module and to the third-party server, a request for the value transfer (step 1030). Step 1030 is generally similar to that described herein with reference to step 930.

The server 120 receives, via the communications module and from the third-party server, the requested value transfer and stores the value in the temporary data record (step 1040). Step 1040 is generally similar to that described herein with reference to step 940.

In another embodiment, the server 120 may receive the value transfer by way of email money transfer. In this embodiment, the server 120 may configure the temporary data record to automatically deposit value sent via email money transfer. For example, the user may send an email money transfer to transfer funds from their persistent account (hosted by a third-party server). The email money transfer may be sent to their personal email address. The personal email address may be associated with the temporary data record. When the user receives the email money transfer, the value may be automatically deposited in the temporary data record. In this embodiment, the server 120 does not require information regarding the value to be transferred as the value to be transferred is configured by the user when generating the email money transfer request.

In another embodiment, the server 120 may generate a temporary password or code to be used by the user to accept an email money transfer. For example, the user may send an email money transfer to transfer funds from their persistent account (hosted by a third-party server). The email money transfer may be sent to their personal email address. The email money transfer may include a link to transfer the value into an account hosted by the financial institution associated with the server 120. The user may select the link which may direct the computing device 110 to accept the email money transfer by entering the temporary password or code. Rather than a password or code, the server 120 may provide the user with the account number of the temporary account and this may be used to complete the email money transfer.

The server 120 performs the operation using the stored value in the temporary data record (step 760). As mentioned, the requested operation may be a remittance or an international remittance and as such, the server 120 may complete the remittance or international remittance using the stored value in the temporary data record. Similarly, the requested operation may be a bank draft and as such the bank draft may be generated using the stored value in the temporary data record.

Once the operation has been performed, a notification may be sent to the computing device 110 indicating that the operation is complete. The server 120 may deactivate that temporary data record such that it is no longer in use. In another embodiment, the server 120 may only deactivate the temporary data record when it is determined that the value in the temporary data record is zero.

As described herein with reference to step 720, during operation in the second mode the server 120 determines that the user does not have a persistent account and may engage the digital identity network to obtain verified identity data of the user and complete the requested operation. It will be appreciated that during operation in the first mode, the server 120 may determine that the user is a customer and thus does have a persistent account. In this embodiment, when it is determined that the user does have a persistent account, the server 120 may perform the requested operation using value stored in the persistent account without engaging the digital identity network.

In at least some embodiments, the temporary data record may only be used to complete operations under a certain value amount. For example, the server 120 may determine that the request to perform the operation includes a value transfer request greater than a threshold amount. When it is determined that the request to perform the operation includes the value transfer request greater than the threshold amount, the server 120 may send, via the communications module and to the computing device 110, a signal representing a request for the user to create a persistent account. The verified identity data obtained from the digital identity network may be used to create the persistent account for the user.

Although in embodiments, verified identity data of the user is obtained via the digital identity network, the identity of the user may be further verified by the server 120. For example, the server 120 may send, via the communications module and to the computing device 110, a request for additional identity data of the user. The requested additional identity data may include an image of an identification card of the user and an image of the user. Using the camera associated with the computing device 110, the user may capture an image of their identification card and may capture an image of themselves and send the captured images to the server 120. The server 120 may analyze the captured images to ensure that the image of user matches the picture on the identification card to confirm the identity of the user.

In one or more embodiments, the digital identity network may provide additional information regarding the user. For example, a digital asset provider may provide a credit score of the user and this information may be used by the financial institution of the server 120 to further verify or authenticate the user.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A server comprising:
a communications module;
a processor coupled with the communications module; and
a memory coupled to the processor and storing processor-executable instructions which, when executed by the processor, configure the processor to:
send, via the communications module and to a computing device, a graphical user interface for display on the computing device that includes a toggle that can be selected by a user via touch input to toggle between a first mode of operation that requires the user to have a persistent account and a second mode of operation that does not require the user to have the persistent account;
receive, via the communications module and from the computing device, an indication of user selection of the second mode of operation;
responsive to receiving the indication of user selection of the second mode of operation, send, via the communications module and to the computing device, a graphical user interface for display on the computing device for requesting that the server perform one or more operations;
receive, via the communications module and from the computing device, a request from the user to perform an operation;
obtain, via the communications module and from a digital identity network, verified identity data of the user;
generate a temporary data record and associate the temporary data record with the verified identity data of the user;
receive a value transfer based on the requested operation and store the received value in the temporary data record; and
perform the operation using the stored value in the temporary data record.

2. The server of claim 1, wherein the instructions, when executed by the processor, further configure the processor to:
in response to performing the operation, deactivate the temporary data record.

3. The server of claim 1, wherein the instructions, when executed by the processor, further configure the processor to:
determine that a value in the temporary data record is zero; and
in response to determining that the value in the temporary data record is zero, deactivate the temporary data record.

4. The server of claim 1, wherein the temporary data record is a single use data record.

5. The server of claim 1, wherein the instructions, when executed by the processor, further configure the processor to:

receive, via the communications module and from the digital identity network, identification of an account hosted by a third-party server providing the value transfer.

6. The server of claim 5, wherein the instructions, when executed by the processor, further configure the processor to:
send, via the communications module and to the third-party server, a request for the value transfer.

7. The server of claim 1, wherein the instructions, when executed by the processor, further configure the processor to:
determine that the request to perform the operation includes a value transfer request greater than a threshold amount; and
when it is determined that the request to perform the operation includes the value transfer request greater than the threshold amount, send, via the communications module and to the computing device, a request for the user to create a persistent account.

8. The server of claim 1, wherein the instructions, when executed by the processor, further configure the processor to:
send, via the communications module and to the computing device, a request for additional identity data confirming the identity of the user;
receive, via the communications module and from the computing device, the requested additional identity data; and
analyze the received additional identity data to confirm the identity of the user.

9. The server of claim 1, wherein the instructions, when executed by the processor, further configure the processor to:
receive, via the communications module and from the computing device, an indication of user selection of the first mode of operation; and
perform the operation using value stored in the persistent account without engaging the digital identity network.

10. The server of claim 1, wherein the digital identity network includes a permissioned blockchain network.

11. A computer-implemented method comprising:
sending, via a communications module and to a computing device, a graphical user interface for display on the computing device that includes a toggle that can be selected by a user via touch input to toggle between a first mode of operation that requires the user to have a persistent account and a second mode of operation that does not require the user to have the persistent account;
receiving, via the communications module and from the computing device, an indication of user selection of the second mode of operation;
responsive to receiving the indication of user selection of the second mode of operation, sending, via the communications module and to the computing device, a graphical user interface for display on the computing device for requesting that the server perform one or more operations;
receiving, via the communications module and from the computing device, a request from the user to perform an operation;
obtaining, via the communications module and from a digital identity network, verified identity data of the user;
generating a temporary data record and associating the temporary data record with the verified identity data of the user;

receiving a value transfer based on the requested operation and storing the received value in the temporary data record; and
performing the operation using the stored value in the temporary data record.

12. The computer-implemented method of claim 11, further comprising:
in response to performing the operation, deactivating the temporary data record.

13. The computer-implemented method of claim 11, further comprising:
determining that a value in the temporary data record is zero; and
in response to determining that the value in the temporary data record is zero, deactivating the temporary data record.

14. The computer-implemented method of claim 11, wherein the temporary data record is a single use data record.

15. The computer-implemented method of claim 11, further comprising:
receiving, via the communications module and from the digital identity network, identification of an account hosted by a third-party server providing the value transfer.

16. The computer-implemented method of claim 15, further comprising:
sending, via the communications module and to the third-party server, a request for the value transfer.

17. The computer-implemented method of claim 11, further comprising:
determining that the request to perform the operation includes a value transfer request greater than a threshold amount; and
when it is determined that the request to perform the operation includes the value transfer request greater than the threshold amount, sending, via the communications module and to the computing device, a request for the user to create a persistent account.

18. The computer-implemented method of claim 11, further comprising:
sending, via the communications module and to the computing device, a request for additional identity data confirming the identity of the user;
receiving, via the communications module and from the computing device, the requested additional identity data; and
analyzing the received additional identity data to confirm the identity of the user.

19. The computer-implemented method of claim 11, further comprising:
receiving, via the communications module and from the computing device, an indication of user selection of the first mode of operation; and
performing the operation using value stored in the persistent account without engaging the digital identity network.

20. A non-transitory computer readable storage medium comprising computer-executable instructions which, when executed, configure a processor to:
send, via the communications module and to a computing device, a graphical user interface for display on the computing device that includes a toggle that can be selected by a user via touch input to toggle between a first mode of operation that requires the user to have a persistent account and a second mode of operation that does not require the user to have the persistent account;

receive, via the communications module and from the computing device, an indication of user selection of the second mode of operation;

responsive to receiving the indication of user selection of the second mode of operation, send, via the communications module and to the computing device, a graphical user interface for display on the computing device for requesting that the server perform one or more operations;

receive, via the communications module and from the computing device, a request from the user to perform an operation;

obtain, via the communications module and from a digital identity network, verified identity data of the user;

generate a temporary data record and associate the temporary data record with the verified identity data of the user;

receive a value transfer based on the requested operation and store the received value in the temporary data record; and perform the operation using the stored value in the temporary data record.

21. The non-transitory computer readable storage medium of claim 20, wherein the instructions, when executed by the processor, further configure the processor to:

in response to performing the operation, deactivate the temporary data record.

22. The non-transitory computer readable storage medium of claim 20, wherein the instructions, when executed by the processor, further configure the processor to:

determine that a value in the temporary data record is zero; and in response to determining that the value in the temporary data record is zero, deactivate the temporary data record.

\* \* \* \* \*